Jan. 24, 1967  S. P. LEWIS  3,299,971
CORE DRILL
Filed Aug. 6, 1964  2 Sheets-Sheet 2

INVENTOR.
SAMUEL P. LEWIS
BY
Arthur Frederick
ATTORNEY

United States Patent Office 3,299,971
Patented Jan. 24, 1967

3,299,971
CORE DRILL
Samuel P. Lewis, Phillipsburg, N.J., assignor to Ingersoll-Rand Company, New York, N.Y., a corporation of New Jersey
Filed Aug. 6, 1964, Ser. No. 387,936
11 Claims. (Cl. 175—92)

This invention relates to kerf or core drills and more specifically to a down-the-hole core drill of the impact or percussive type.

Conventionally, core drilling is achieved by rotary drilling apparatuses which can only obtain a relatively short length of core before it is necessary to remove it from the hole. In addition, these rotary drilling apparatuses employ drilling "mud" fluid to achieve drilling, which fluid is expensive.

Accordingly, it is an object of this invention to provide a core drill which employs air as a drilling fluid and provides a continuous core.

Another object of the present invention is to provide a core drill in which the drilling power or energy is produced within the hole being bored.

A further object of this invention is to provide a down-the-hole percussive drill capable of boring a continuous core.

The foregoing and other objects are carried out by providing a core drill which has a casing with a drill bit mounted within one end of the casing for limited axial movement relative to the casing. A tubular guide is mounted within the casing and dimensioned to be spaced from the casing to provide an annular space between the casing and the core guide. A hollow tubular piston is mounted within the annular space for axial movement therein. The annular space also provides passage means for delivering pressurized fluid to the piston means. Valve means are disposed within the annular space for controlling the flow of pressurized fluid to opposite sides of the piston to cause the piston to deliver an impact to the drill bit.

In view of the foregoing, a novel core drill is contemplated, which core drill comprises an impact drill bit assembly suspended from a hollow drill string. The impact drill bit assembly consists of a piston or hammer disposed within a cylinder for reciprocating and intermittent impaction against a calyx bit or cutter. Means for conducting the compressed air to the drill bit assembly and distributing the air alternately to the front and back ends of the cylinder is provided to effect the reciprocation of the hammer.

A feature of the present invention is the tubular configuration of the hammer which is disposed around a tubular member defining a core passageway through the drill bit assembly and drill string so that a continuous core is produced and removed from the hole being bored.

The invention will be more fully understood from the following detailed description thereof when considered in connection with the accompanying drawings in which:

FIG. 1A is a longitudinal, sectional view of the lower portion of the core drill shown in FIG. 1 and joined to the upper portion along line A—A of FIG. 1;

Figure 1:
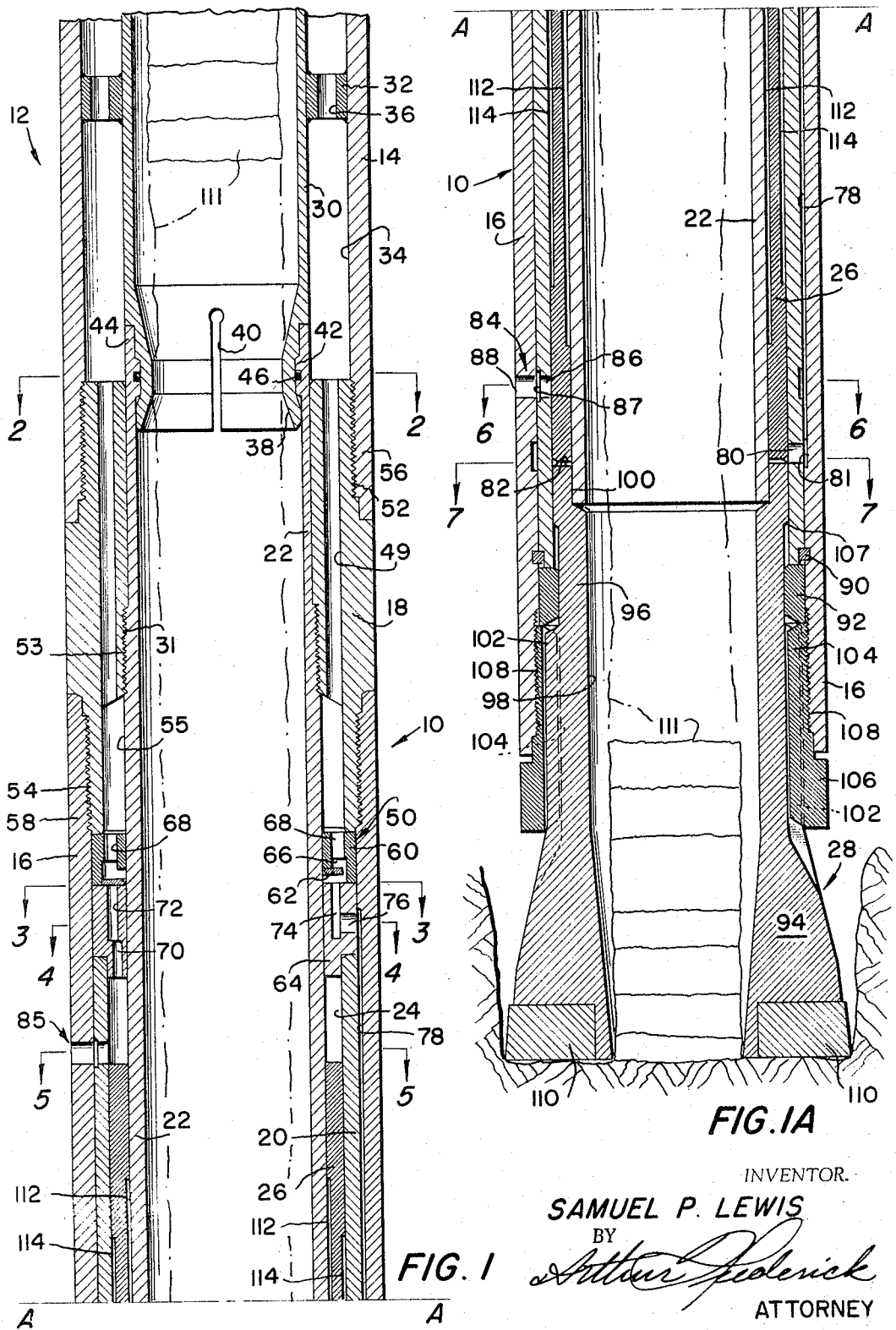
FIG. 1 is a longitudinal, sectional view through the upper portion of the core drill according to this invention and joined to the lower portion of the core drill along line A—A of FIG. 1A.
Figure 6:
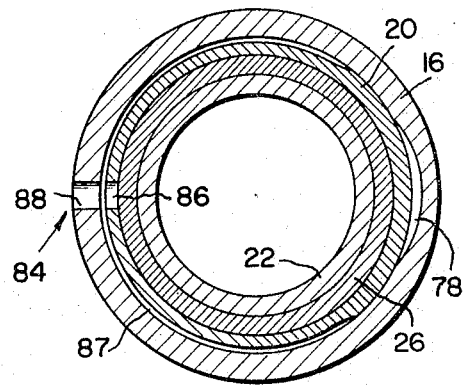
Figure 7:
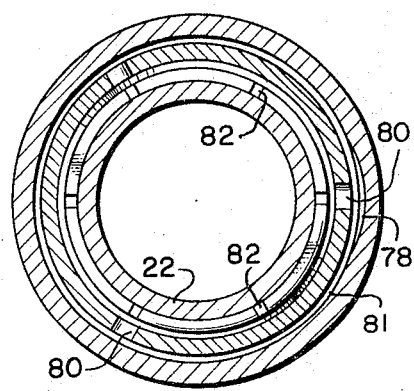
Figure 8:
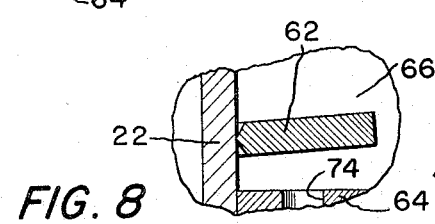

FIGS. 2, 3, 4, and 5 are cross-sectional views taken along lines 2—2, 3—3, 4—4, and 5—5, respectively, of FIG. 1;

FIGS. 6 and 7 are cross-sectional views taken along lines 6—6 and 7—7, respectively, of FIG. 1A; and FIG. 8 is a fragmentary view, on a greatly enlarged scale, of the flapper valve shown in FIG. 1.

Now referring to the drawings, the reference number 10 designates the impact drill bit assembly connected to the distal end of a drill string 12 which consists of a plurality of endwise-connected hollow drill rods 14.

The impact drill bit assembly 10 comprises a tubular wear sleeve or casing 16 to which is connected a tubular backhead member 18. Concentrically disposed within wear sleeve 16 is a hollow cylindrical member 20 which defines with a tubular core guide member 22 of smaller diameter than cylindrical member 20 an annular piston or hammer chamber 24. Disposed for axial reciprocation within chamber 24 is a piston or hammer 26. Held within the lower end of wear sleeve 16 is a calyx drill bit or cutter 28 of the rotary-percussive type and disposed to be subjected to intermittent impacts by hammer 26.

Each of the drill rods 14 includes a tubular core guide 30 which is coaxially supported in spaced relationship to the inner surface of the drill rod by a plurality of axially spaced, annular spacing rings 32 (only one of which is shown in FIG. 1). Drill rod 14 and core guide 30 define therebetween an annular fluid passageway 34. Spacing rings 32 are provided with a plurality of peripherally spaced openings 36 to permit the passage of the fluid through the fluid passageway 34. The lower end portion 38 of each of the core guides 30 of each drill rod 14 is of reduced diameter and is flared outwardly adjacent its end. The end portion 38 is provided with a plurality of splits 40 to impart resiliency to the end portion 38 so that the end portion 38 will compress as it is inserted past an internal annular restriction 42 formed in the upper end portion 44 of the next lower tubular core guide 30, the upper end portion 44 of each core guide 30 being of the same construction as shown in FIG. 1 for tubular core guide member 22. An O-ring seal 46 is carried in a groove in annular restriction 42 to seal the interstices between the telescoping end portions 38 and 44 of adjacent tubular core guides 30 and the endmost tubular core guide 30 and core guide member 22. The uppermost drill rod 14 is suitably connected to communicate with a source of pressurized fluid—as, for example, an air compressor—and thereby receive and conduct the pressurized fluid via annular fluid passageway 34 to impact drill bit assembly 10.

Figure 2:
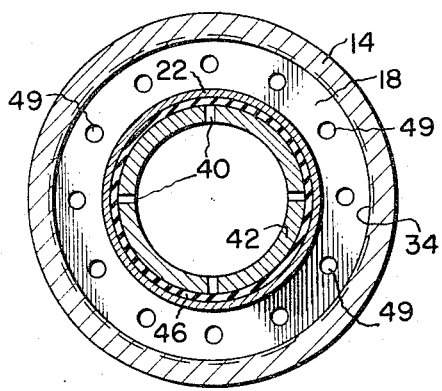
Figure 5:
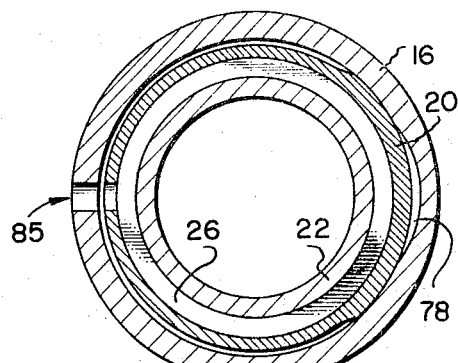

As best shown in FIGS. 1 and 2, backhead 18 is provided with a plurality of circumferentially spaced holes 49 to pass the pressurized fluid to a control valve assembly 50. Backhead 18 has reduced diameter, threaded opposite end portions 52 and 54 for connection with internally threaded end portion 56 of drill rod 14 and internally threaded end portion 58 of wear sleeve 16. Backhead 18 is also provided with internal threads 53 which mesh with threads 31 on core guide member 22 for connection of the latter with backhead 18. Backhead 18 is counterbored adjacent its end portion 54 to define with control valve 50 an annular chamber 55.

Control valve assembly 50 comprises an annular, ring-shaped valve chest 60, an annular flapper valve 62, and an annular, ring-shaped valve seat 64 disposed between tubular core guide member 22 and wear sleeve 16. Valve chest 60 and valve seat 64 are clamped in abutment against each other between end portion 54 of backhead 18 and the end of cylindrical member 20. Valve chest 60 is provided with an axial recess 66 in one end thereof, in which recess a flapper valve 62 is housed. A plurality of peripherally spaced holes 68 provide for the flow of the pressurized fluid from annular chamber 55 into recess 66.

Figure 3:
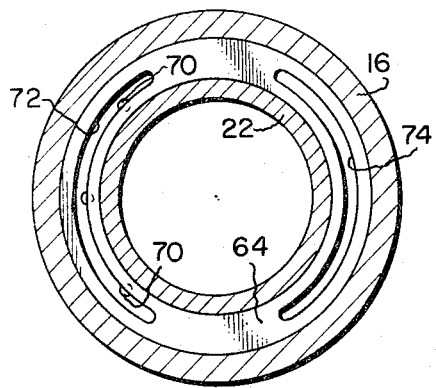
Figure 4:
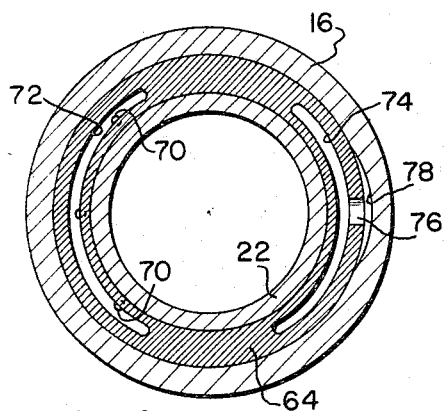

As best shown in FIGS. 1, 3, and 4, valve seat 64 has a plurality of fluid inlet ports 70 which communicate at one end with an arcuate-shaped slot 72 (see FIG. 3) in the upper surface of the valve seat and at the opposite end communicate with the upper end portion of hammer chamber 24. In the upper surface of valve seat 64, diametrically opposite arcuate-shaped slot 72, an arcuate-shaped recess 74 is formed to provide for the flow of the pressurized fluid to the front end of hammer chamber 24 as hereinafter described. As best shown in FIGS. 1 and 4, a port 76 is provided in valve seat 64 to convey the pressurized fluid from recess 74 into a longitudinally extending passageway 78 defined between a groove in the inner surface of wear sleeve 16 and the outer surfaces of valve seat 64 and cylindrical member 20.

As shown in FIGS. 1A and 7, passageway 78 communicates at its lower end with a hammer return port 80 which communicates with the lower end of hammer chamber 24 via an annular recess 81 in wear sleeve 16 and the radial grooves 82 formed in the upper surface portion of drill bit 28. The pressurized fluid flowing into hammer chamber 24 by way of port 80, annular recess 81, and radial grooves 82 effects the movement of piston 26 rearwardly; that is, in a direction toward control valve assembly 50. The pressurized fluid is exhausted from the lower portion of hammer chamber 24 through an exhaust port 84 consisting of a hole 86, an arcuate groove 87 in cylindrical member 20, and a hole 88 in wear sleeve 16. Similarly, the pressurized fluid is exhausted from the upper part of hammer chamber 24 through an exhaust port 85 (see FIG. 1).

The flapper valve 62 rocks or tilts in response to the differential pressure across the valve so as to control the flow of the pressurized fluid alternately through ports 70 and port 76 and, hence, alternately to the front and the rear portions of hammer chamber 24 and thereby cause the reciprocation of hammer 26.

As shown in FIG. 1A, cylindrical member 20 is secured within wear sleeve 16 by a retaining ring 90 and in abutment against a bit retaining ring 92.

Core drill bit 28 comprises a head portion 94 integrally formed with a shank portion 96 and having an axial bore 98 therethrough which is coextensive and communicates with the interior of cylindrical guide member 22. The upper end of shank portion 96 is counterbored at 100 to receive the lower end of guide member 22 therein. The outer surface of shank portion 96 is provided with longitudinally extending splines 102 which mesh with complementary splines 104 of a drill chuck 106. Chuck 106 is threadably secured at 108 to the lower end of wear sleeve 16. The spline interconnection between chuck 106 and drill bit 28 permits the latter to be rotated simultaneous with the axial movement relative to chuck 106 and wear sleeve 16. The extent of relative axial movement of drill bit 28 in a forward direction is limited by the abutment of an annular shoulder 107 formed on shank portion 96 and bit retaining ring 92. The movement of drill bit 28 in a rearward direction is limited by the abutment of the end of splines 102 against retaining ring 92. The annular working face of head portion 94 may be constructed with a plurality of peripherally spaced tungsten carbide inserts 110 for providing the bit with wear-resistant cutting edges.

The above-described drill string 12 and impact drill bit assembly 10 are connected aboveground to a suitable motor means for rotating, longitudinally feeding, and supplying the pressurized fluid to drill string 12 and impact drill bit assembly 10. A typical motor means may be of the type shown in U.S. patent application, Serial No. 294,962, filed July 15, 1963, now U.S. Patent No. 3,155,-179, and shown in U.S. Patent No. 2,985,249. The motor means may be constructed so as to provide the movement of the core through the motor means as disclosed in U.S. patent application, Serial No. 173,389, dated February 15, 1962, now U.S. Patent No. 3,154,158. Other suitable means for continuously removing the core being bored may be provided without departing from the scope and spirit of this invention.

In the operation of the core drill according to this invention, pressurized fluid, such as compressed air, is supplied to annular passageway 34 of the uppermost drill rod 14 by suitable means, not shown. The pressurized fluid flows from passageway 34 of the drill rod 14, which is connected to impact drill bit assembly 10, into holes 49 in backhead 18. From backhead 18 the pressurized fluid flows into annular chamber 55 and thence into holes 68 of valve chest 60. As shown in FIGS. 1 and 1A, the position of flapper valve 62 is such that the pressurized fluid is prevented from flowing into the rear of hammer chamber 24 by reason of the differential pressure across the flapper valve in communication with chamber 24 in communication with a low-pressure space through exhaust port 85. However, flapper valve 62 is positioned to permit the flow of the pressurized fluid from recess 66 into arcuate recess 74 and into port 76. From port 76 the pressurized fluid flows through passageway 78 into port 80 and thence into the lower portion of hammer chamber 24 via grooves 82. The flow of the pressurized fluid into the lower end of hammer chamber 24, which fluid acts on the end surface of hammer 26, forces the hammer rearwardly in hammer chamber 24 until exhaust port 84 comes into communication with the lower portion of the hammer chamber. As the hammer moves rearwardly exhaust port 85 closes; and, as the pressurized fluid in the upper portion of the hammer chamber is compressed, a pressure imbalance across flapper valve 62 is created through ports 70 and arcuate slot 72. This imbalance causes the flapper valve to tilt to a position closing recess 74 and port 76 and opening the upper portion of hammer chamber 24 to the pressurized fluid through ports 70 and slot 72. The flow of the pressurized fluid into the upper part of hammer chamber 24 drives hammer 26 forwardly to impact against the end of shank portion 96 of drill bit 28. When hammer 26 travels a sufficient distance to expose exhaust port 85, the pressurized fluid is exhausted from chamber 24 to the interior of the hole being bored. With the flapper valve controlling the flow of the pressurized fluid alternately to the front and the rear portions of hammer chamber 24, hammer 26 intermittently delivers impact blows to drill bit 28. Simultaneous with the impacting of drill bit 28, drill bit 28, through drill string 12, is rotated by conventional means (not shown).

As the hole is bored, a core 111 (see FIG. 1A) is formed and, as the boring progresses, the core is guided and retained by guide member 22 and core guides 30 of drill rods 14.

To provide for continuously carrying away the core, the pressurized exhaust fluid is discharged into the bored hole through exhaust ports 84 and 85. To insure the movement of the pressurized fluid down the bored hole, into axial bore 98, through drill bit 28 and into the interiors of core guides 30, additional pressurized fluid may be introduced into the hole at the ground surface through a hood (not shown) placed about the drill string and over the bored hole.

To reduce the frictional resistance to the reciprocation of hammer 26, the inner surface and the outer surface between the opposite end portions of the hammer may be undercut or recessed at 112 and 114, respectively, as shown.

It is believed now readily apparent that a novel core drill which has an impact motor means in the hole being bored and provides for a continuous extraction of a core has been provided.

Although but one embodiment of the invention has been illustrated and described in detail, it is to be expressly understood that the invention is not limited thereto. Various changes can be made in the arrangement of parts without departing from the spirit and scope of the invention, as the same will now be understood by those skilled in the art.

I claim:
1. A core drill comprising:
   an elongated casing;
   a drill bit mounted within one end of said casing for rotation with said casing and limited axial movement relative to said casing;

said casing being dimensioned to follow said drill bit down a hole being drilled;

tubular means mounted within said casing to provide a continuously unobstructed passage between the drill bit and the top of said casing and dimensioned to be spaced from said casing to define an annular space;

piston means mounted for axial movement within said annular space;

passage means for delivering pressurized fluid to said piston means; and annular valve means disposed within said annular space for controlling the flow of pressurized fluid to opposite sides of said piston means to cause said piston means to deliver an impact to said drill bit.

2. The core drill of claim 1 wherein said drill bit is hollow.

3. The core drill of claim 1 wherein said piston means is tubular in configuration.

4. The core drill of claim 1 wherein said valve means includes a valve seat, a valve chest having a passage therethrough and an annular flapper valve disposed between said valve seat and valve chest.

5. The core drill of claim 4 further including an annular sleeve mounted within said annular space between said casing and piston means and providing a passage around said piston means for conducting pressurized fluid to one end of said piston means for raising said piston means.

6. The core drill of claim 5 wherein said valve seat has a passage for conducting pressurized fluid to the passage around said piston means.

7. The core drill of claim 6 wherein said valve seat has a second passage therethrough for conducting pressurized fluid to the other end of said piston means and said casing is provided with exhaust ports for passing spent pressurized fluid into the hole being drilled.

8. A core drill comprising:
(a) a drill rod,
(b) an elongated casing means connected to said drill rod,
(c) a drill bit connected to the distal end of said casing means for conjoined rotation with the latter and limited axial movement relative to the casing means,
(d) said drill bit having an axial bore therethrough,
(e) a tube means disposed in said drill rod and said casing means in spaced relation with the latter and coextensive with the axial bore in said drill bit to receive and guide a core being bored,
(f) a valve disposed in the space between the casing means and said tube means,
(g) said tube means in said casing means defining with the latter, the drill bit, and the valve, an annular piston chamber,
(h) a piston disposed for reciprocation in said piston chamber,
(i) a source of pressurized fluid connected to said drill rod to deliver the pressurized fluid to the space defined between the drill rod and the tube means,
(j) first passage means in said valve for communicating said space between the drill rod and the tube means with one end of said piston chamber,
(k) second passage means in said valve for communicating said space between the drill rod and the tube means with the other end of said piston chamber, and
(l) exhaust ports communicating with the opposite ends of the piston chamber to pass spent pressurized fluid from the piston chamber into the hole being bored,
(m) said valve means functioning to alternately open and close said first and said second passage means and thereby cause the piston to reciprocate and intermittently strike the drill bit.

9. The apparatus of claim 8 wherein said casing means comprises a wear sleeve and a piston-cylinder lining the wear sleeve.

10. A core drill comprising:
(a) a drill rod,
(b) an elongated casing connected to said drill rod for conjoined rotation with the latter,
(c) a hollow drill bit connected to the distal end of the casing for conjoined rotation with the latter and limited, relative axial movement with respect to the casing,
(d) a hollow cylindrical member disposed to line the interior surface of said casing,
(e) a tube means disposed in said hollow cylindrical member and dimensioned to be spaced from the latter to define an annular space,
(f) said tube means being coextensive with the interior of said hollow drill bit to receive a core being bored by the latter,
(g) a control valve disposed in said annular space and axially spaced from the drill bit to define with the latter, the tube means, and the cylindrical member, a piston chamber,
(h) a tubular piston disposed in said piston chamber for reciprocation within the latter,
(i) means for providing the flow of the pressurized fluid through said drill rod to said control valve,
(j) first passage means in said control valve for passing the pressurized fluid to one end of said piston chamber,
(k) second passage means in said control valve for passing the pressurized fluid to the opposite end of said piston chamber, and
(l) exhaust ports at the opposite end portions of said piston chamber to pass spent pressurized fluid into the hole being bored,
(m) said control valve functioning in response to the differential pressure thereacross to alternately open and close said first and said second passage means and thereby cause the piston to reciprocate and strike the drill bit.

11. A core drill comprising:
(a) a casing,
(b) a hollow cylindrical member secured coaxially within said casing,
(c) a drill bit having an axial bore therethrough and connected for limited reciprocative movement to said casing,
(d) a core guide member disposed in and secured to said casing with the outer surface thereof defining with the inner surface of said hollow cylindrical member an annular piston chamber,
(e) a tubular hammer disposed in said piston chamber for reciprocation therein and impaction against said drill bit,
(f) a fluid control valve disposed in said casing,
(g) means for conducting the pressurized fluid to said fluid control valve,
(h) first passage means communicating at one end with said control valve and at the other end with an end portion of the piston chamber,
(i) second passage means communicating at one end with said control valve and at the other end with the opposite end of said piston chamber,
(j) said control valve operative to alternately privide for the flow of the pressurized fluid through said first and said second passage means so as to effect the reciprocation of said hammer and thereby cause the latter to intermittently impact against said drill bit, and
(k) means for supporting said casing in the hole being bored.

(References on following page)

References Cited by the Examiner

UNITED STATES PATENTS

| | | | |
|---|---|---|---|
| 1,087,632 | 2/1914 | Benjamin | 175—100 |
| 1,897,121 | 2/1933 | Harris | 175—296 |
| 2,345,739 | 4/1944 | Fisher | 175—92 |
| 2,915,284 | 12/1959 | Ortloff | 175—92 |
| 3,051,134 | 8/1962 | Lincoln | 173—78 |
| 3,084,673 | 4/1963 | Sears | 173—78 |
| 3,162,251 | 12/1964 | Bassinger | 173—78 |

CHARLES E. O'CONNELL, *Primary Examiner.*

JAMES A. LEPPINK, *Examiner.*